United States Patent [19]

Richard

[11] 4,177,248
[45] Dec. 4, 1979

[54] PRODUCTION OF SULFUR DIOXIDE FROM WASTE SULFURIC ACID

[75] Inventor: Wilfred T. Richard, Houston, Tex.

[73] Assignee: Stauffer Chemical Company, Westport, Conn.

[21] Appl. No.: 860,035

[22] Filed: Dec. 12, 1977

Related U.S. Application Data

[63] Continuation of Ser. No. 706,401, Jul. 19, 1976, abandoned, which is a continuation of Ser. No. 656,766, Feb. 9, 1976, abandoned, which is a continuation of Ser. No. 568,958, Apr. 17, 1975, abandoned, which is a continuation of Ser. No. 438,091, Jan. 30, 1974, abandoned.

[51] Int. Cl.² .................. C01B 17/50; C01B 17/52; C01B 17/72
[52] U.S. Cl. .................................... 423/540; 423/542; 423/522
[58] Field of Search ............... 423/531, 540, 539, 525, 423/541, 541 A, 542, 543

[56] References Cited

U.S. PATENT DOCUMENTS

| 2,357,195 | 8/1944 | Herrmann | 423/531 |
| 3,359,069 | 12/1967 | Furkert et al. | 423/540 |
| 3,825,657 | 7/1974 | Jenniges | 423/540 |

FOREIGN PATENT DOCUMENTS

| 1061304 | 7/1959 | Fed. Rep. of Germany | 423/545 |
| 1067793 | 10/1959 | Fed. Rep. of Germany | 423/545 |

*Primary Examiner*—O. R. Vertiz
*Assistant Examiner*—Gary P. Straub
*Attorney, Agent, or Firm*—Michael J. Bradley

[57] ABSTRACT

Sulfuric acid of high strength is recovered from spent acids by scrubbing furnace gases with sulfuric acid containing 45 percent to 65 percent $H_2SO_4$, removing mist from the gases, cooling the gases and removing water, and pre-drying the gases before final drying and product make-up.

2 Claims, 1 Drawing Figure

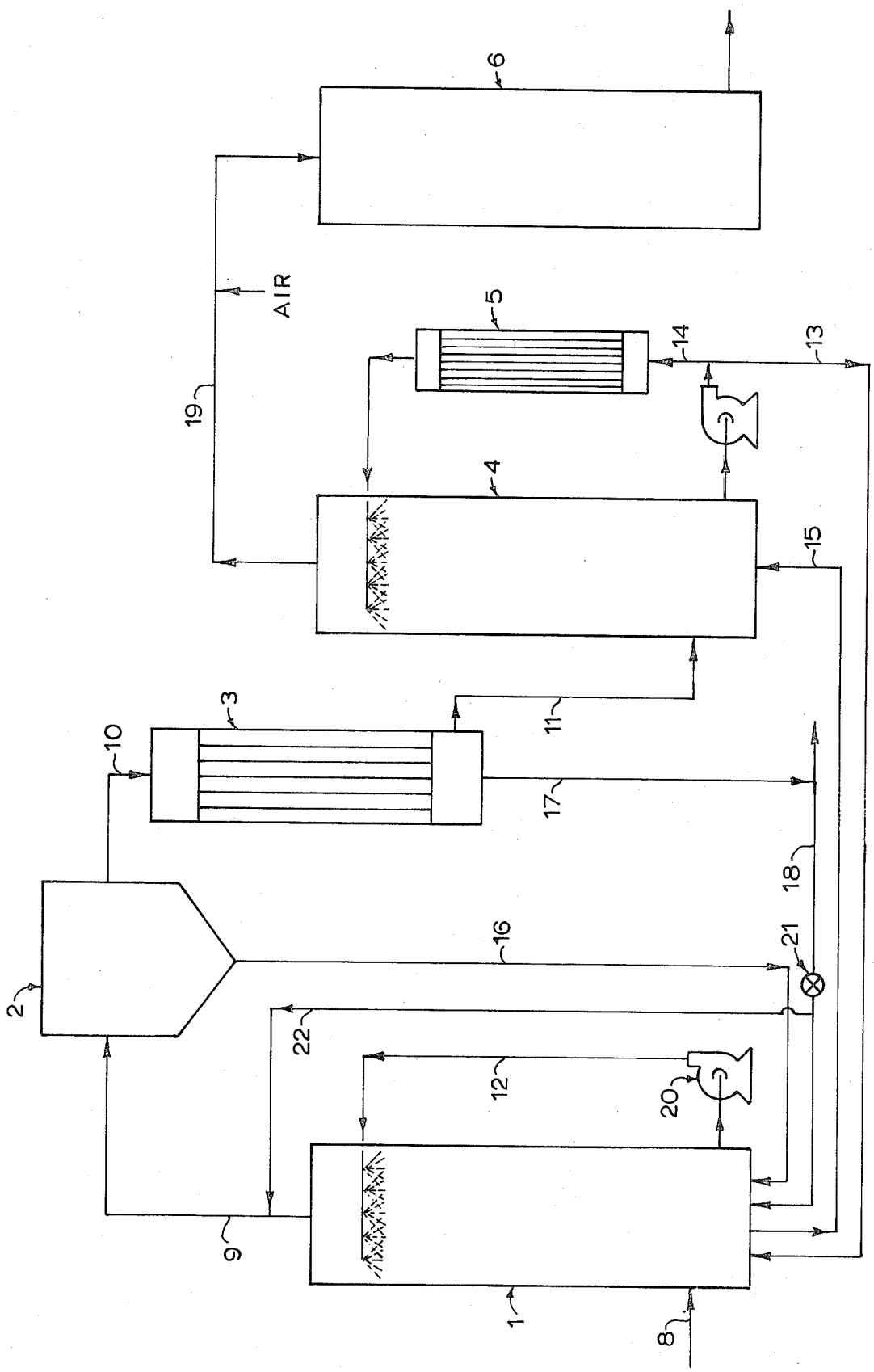

PRODUCTION OF SULFUR DIOXIDE FROM WASTE SULFURIC ACID

This is a continuation of application Ser. No. 706,401, filed July 19, 1976 abandoned which is a continuation of application Ser. No. 656,766, filed Feb. 9, 1976, abandoned which is a continuation of application Ser. No. 568,958, filed Apr. 17, 1975, abandoned which is a continuation of application Ser. No. 438,091, filed Jan. 30, 1974, now abandoned.

BACKGROUND OF THE INVENTION

This invention relates to an improved procedure for regeneration of spent sulfuric acids, especially those recovered from petrochemical and refinery processes. More particularly, the invention relates to a novel process for regenerating spent sulfuric acid in which a pre-drying system is employed to improve product acid strength.

In one known process for the regeneration of spent (waste) sulfuric acids, the acids are fed to a high temperature (e.g., 1600° F. to about 2300° F.) furnace where they are transformed into sulfur dioxide, water vapor and other gaseous products. The sulfur dioxide and gaseous products are normally passed to a waste heat boiler to remove heat, then to a scrubbing zone where they are contacted with dilute sulfuric acid, cooled to a temperature of from about 150° F. to about 260° F., and become humid on cooling. The gases are then cooled further in a heat exchanger (preferably water cooled) to a temperature of from about 100° F. to about 120° F. Appreciable condensation occurs in this exchanger, and the water is removed, a portion of the water being returned to the scrubber. The gases pass to an acid mist removal zone where acid mist is collected and removed. The gases are then forwarded to a drying zone or tower. Prior to the entry of the gases into the drying tower, atmospheric air is added to bring the oxygen content to a value suitable for converter operation. In the drying tower, water remaining in the gases is removed by contacting the gases with strong sulfuric acid (93 percent to 98 percent by weight $H_2SO_4$). Any water remaining at this point appears in the product acid.

One problem associated with this procedure is that when refinery or petrochemical sulfuric acids of high hydrocarbon or water content are regenerated, the relatively low sulfuric acid content (e.g., 25 weight percent to 92 weight percent) results in gas streams containing less than desirable amounts of sulfur dioxide. Consequently, the amount of water collected in the drying zone or tower may be such that sulfuric acid of the desired strength cannot be produced. This problem is exacerbated by the increased efficiency in utilization of sulfuric acid by refinery and petrochemical users and has resulted in a decrease in the total amount of acid recoverable from waste streams.

SUMMARY OF THE INVENTION

Accordingly, the present invention provides a method of recovering sulfuric acid of high strength from waste acids having a wide range of compositions. Briefly, this desirable result is achieved by providing for scrubbing of the gases with acid of specified strength and for removal of water prior to entry of the furnace gases into the drying zone or tower. More particularly, the method of the invention provides a system of internally recycling water to the scrubbing zone in such a way that acid strength in the zone is regulated within specified limits and water content in the furnace gases entering the drying tower is considerably reduced.

DETAILED DESCRIPTION OF THE INVENTION

In order to describe the invention more fully, reference is made to the accompanying drawing.

Hot furnace gases derived from the regeneration of spent acids containing from 25 percent (by weight) to 92 percent $H_2SO_4$ pass through line 8 from a waste heat boiler (not shown) and enter a scrubbing zone containing scrubber (1). In scrubber 1, the gases are humidified and cooled by a spray of sulfuric acid furnished by pump (20) through line (12). Although a conventional scrubber is shown, other types of scrubbers may be used, e.g., a Venturi scrubber. The scrubber acid is of moderate strength, and is generally of the order of 45 percent to 65 percent by weight sulfuric acid. The temperature of the scrubber acid is about 150° F. to about 250° F., and the temperature of the scrubber exit gases is from about 150° F. to about 260° F. The scrubber acid is circulated continuously by pump 20 through line 12. Impurity buildup in scrubber 1 is prevented by periodic or continuous purge, as evident to those skilled in the art.

Instead of cooling the gases immediately after leaving scrubber 1, as done previously, the gases pass through line (9) to a mist removal unit (2) which may be of any conventional design. For example, mist removal unit (2) may be of the filter, impinger, or electrostatic precipitator type. In any event, acid mist is removed as dilute acid (8 percent to 15 percent $H_2SO_4$) and returned via line 16 to scrubbing zone (1).

The mist-free gases now pass via line 10 to a cooling zone containing heat exchanger or cooler 3, where they are cooled to a temperature of about 100° F. to about 130° F. Heat exchanger 3 is preferably an indirect heat exchanger utilizing ordinary cooling water. Condensate, virtually acid-free, is removed via line 17. The bulk of the condensate is stripped and sewered, any sulfur dioxide recovered being returned to the system according to conventional practice. A portion of the condensate may be sent via line 22 to desuperheat the gases entering 2, and a second portion is returned to scrubbing zone 1 via line 18. Valve 21 may be employed in line 18 to regulate the liquid level in scrubber 1.

The cooled gases now pass from heat-exchanger 3 via line 11 to a pre-drying zone containing pre-drying tower 4. Pre-drying tower 4 may be of conventional construction, or, preferably, may be of the Venturi type. The gases may be cooled further and are partially dried by direct contact with a recirculating sulfuric acid of moderate strength, e.g., from about 40 percent to about 60 percent $H_2SO_4$. The acid is continuously circulated through cooler 5 via line 14. Entry temperature of the recirculating acid is from about 100° F. to about 120° F., while exit temperature is from about 110° F. to about 130° F. The temperature of the gases is reduced to about 110° F. to about 120° F. Lines 13 and 15, respectively, conduct pre-drying tower acid to the scrubber and scrubber acid to the pre-drying tower. This cross-feed maintains acid and water concentrations at the chosen operating level and amounts to a net transfer of water from the pre-drying tower to the scrubber. In general, the acid strength in the scrubber will be maintained at a level of from 1 to 10 or up to 15 percent higher than the acid strength in the pre-drying zone.

Thus, acid strengths will range from about 45 percent to about 65 percent $H_2SO_4$, in the scrubbing zone, and from about 45 percent to about 60 percent in the pre-drying zones. A range of from about 50 percent to about 65 percent $H_2SO_4$, in the scrubbing zone, and about 45 percent to about 64 percent $H_2SO_4$ in the pre-drying zone is preferred.

The gases are then passed from pre-drying tower 4 via line 19 to a drying zone containing drying tower 6. Prior to entry into tower 6, the gases are mixed with air for dilution. In drying tower 6, the gases are contacted with strong sulfuric acid to give a gas stream suitable for producing sulfuric acid of high grade. The temperature of drying zone 6 is maintained at from about 110° F. to about 140° F., and preferably from about 115° F. to about 115° F.

The following examples illustrate the invention.

EXAMPLE I

About 303 tons per day of spent sulfuric acid containing 61 percent sulfuric acid, 4.76 percent water, and the remainder various hydrocarbons (some of which contain sulfur) are fed to a regeneration furnace maintained at about 1800° F. The product gases are fed, after passing through a waste heat boiler, to scrubbing tower 1, as shown in the drawing. The temperature of the gas leaving the scrubbing tower through line 9 is about 235° F., and the temperature in line 19 from the pre-dryer is about 121° F. The concentration of the acid in the scrubber is maintained at about 60 percent, and the concentration in the pre-drying tower is maintained at about 55 percent. About 44,239 lbs. per hour of acid from the scrubbing tower are crossfed in line 15 to the pre-drying tower, and about 40,550 lbs. per hour are recirculated from the pre-drying tower back through line 13 to the scrubber. Gas leaving the drying tower is passed to a conventional contact sulfuric acid plant from which commercial sulfuric acid is obtained.

EXAMPLE II

In this run, the concentration of the acid in the scrubber is about 65 wt. percent, the concentration in the pre-drying tower is about 60 wt. percent, the temperature in line 9 is about 254° F., and the temperature in line 19 is about 127° F. About 48,925 lbs. per hour of acid are crossfed in line 15 to the pre-drying tower, and about 53,000 lbs. of acid per hour are recirculated in line 13. Gas leaving the drying tower is passed to a conventional contact sulfuric acid plant from which commercial sulfuric acid is obtained.

I claim:

1. A process for the production of $SO_2$ gas suitable for use in producing $H_2SO_4$ comprising the steps of:
    (a) heating spent sulfuric acid containing 25 weight percent to 92 weight percent of $H_2SO_4$ in a furnace at a temperature of from 1600° F. to 2300° F. to produce a gaseous effluent of sulfur dioxide, water vapor and gaseous products;
    (b) passing the effluent to a waste heat boiler to remove heat;
    (c) contacting the gaseous effluent from the waste heat boiler in a scrubbing zone with sulfuric acid maintained at a strength of from about 45 weight percent to about 65 weight percent $H_2SO_4$, the sulfuric acid make-up for the scrubbing zone being obtained from the pre-drying zone wherein the acid is maintained at a strength of from about 40 weight percent to about 60 weight percent $H_2SO_4$ and thereby cooling the effluent to a temperature of from about 150° F. to about 260° F.;
    (d) removing acid mist from the effluent from the scrubbing zone to form a gaseous effluent essentially free of $H_2SO_4$ and $SO_3$;
    (e) cooling the effluent from the acid mist removal zone to a temperature of from about 100° F. to about 130° F. thereby condensing at least a portion of the water vapor remaining in the effluent, said condensed water vapor being virtually free of sulfuric acid;
    (f) contacting the gaseous effluent from the condensation zone in a pre-drying zone with sulfuric acid of from about 45 weight percent to about 65 weight percent $H_2SO_4$ obtained from the scrubbing zone thereby stripping moisture from said gaseous effluent while maintaining the concentration of sulfuric acid in the pre-drying zone at from about 40 weight percent to about 60 weight percent $H_2SO_4$ while any excess pre-drying zone sulfuric acid is transferred to the scrubbing zone as makeup for the scrubbing zone sulfuric acid; and
    (g) contacting the effluent from the pre-drying zone with sulfuric acid having a concentration of from about 93% to 98% $H_2SO_4$ in a final drying zone to produce a dry effluent gas containing $SO_2$ for use in the production of $H_2SO_4$.

2. The process of claim 1 wherein said mist recovered is sent to the scrubbing zone.

* * * * *